United States Patent [19]

Nagashima et al.

[11] Patent Number: 5,242,143
[45] Date of Patent: Sep. 7, 1993

[54] COVER FOR SLIDE RAIL OF AUTOMOTIVE SEAT

[75] Inventors: Hideo Nagashima; Shigeo Takagi, both of Akishima, Japan

[73] Assignee: Tachi-S Co. Ltd., Akishima, Japan

[21] Appl. No.: 850,125

[22] Filed: Mar. 12, 1992

[51] Int. Cl.⁵ .............................................. B60N 2/00
[52] U.S. Cl. ............................. 248/345.1; 248/188.9; 248/429
[58] Field of Search ................. 248/345.1, 188.9, 615, 248/429, 424, 420, 430; 297/218, 219, 346, 341, 322, 329; 296/65.1

[56] References Cited

U.S. PATENT DOCUMENTS

| | | | |
|---|---|---|---|
| 2,910,803 | 11/1959 | Close | 248/345.1 |
| 3,643,905 | 2/1972 | Kint | 248/345.1 |
| 4,365,839 | 12/1982 | Strassle | 248/345.1 X |
| 4,534,533 | 8/1985 | Doerner | 248/345.1 |
| 4,898,417 | 2/1990 | Kudo | |

FOREIGN PATENT DOCUMENTS

| | | |
|---|---|---|
| 126935 | 10/1990 | Japan . |
| 51624 | 5/1991 | Japan . |
| 86837 | 9/1991 | Japan . |
| 744796 | 2/1956 | United Kingdom ............ 248/345.1 |

Primary Examiner—Karen J. Chotkowski
Attorney, Agent, or Firm—Oldham, Oldham & Wilson Co.

[57] ABSTRACT

A cover for a slide rail of an automotive seat, which comprises a first cover section for covering the rearward end portion of slide rail and a second cover section for covering a support leg member which support the slide rail, both of which two cover sections are integrally formed together. The first cover section covers the rearward end portion of slide rail at such a length that extends over a movable raige in which an upper rail of the slide rail moves relative to lower rail thereof. An opening is formed in the cover for permitting the upper rail to pass therethrough without inteference and alid plate is provided to normally close such opening but permit for opening the same when the upper rail is moved therethrough.

7 Claims, 5 Drawing Sheets

COVER FOR SLIDE RAIL OF AUTOMOTIVE SEAT

BACKGROUND OF THE INVENTION

1. Field of Invention

The present invention relates to a cover for covering a slide rail provided in a seat fore-and-aft adjusting device adapted for adjusting an automotive seat in the forward and backward directions.

2. Description of Prior Art

Reference is made to FIG. 9, which shows a rearward side of an automotive seat (1) which is provided with a pair of conventional slide rails (2) (2') for permitting the seat (1) to be adjusted in forward and backward directions. As can be viewed from FIG. 9, the left-side slide rail (2) comprises a generally U-shaped lower rail (2a) and a generally inverted U-shaped upper rail (2b), the former (2a) being slidably fitted in the latter (2b) in an embraced manner, (see FIG. 1), and the right-side slide rail (2') comprises a generally U-shaped upper rail (2'a) and an upstanding upper rail (2'b), the latter (2'b) being slidably engaged in the former (2'a) (see FIG. 2).

As shown, the left-side slide rail (2) has, fixed at its rearward end portion, a support leg member (3) of generally S-shaped configuration, whereas the right-side slide rail (2') also has, fixed at its rearward end portion, a support leg member (3') which extends vertically from the lower rail (2'a) and is formed with a securing flange portion (3'a).

Hitherto, in this sort of rail construction, a pair of separate cap members are fitted over the lower rail rearward edges and externally exposed portion of support leg member, respectively, with a view to improving an aesthetic appearance at the rear side of seat. This example can be seen from FIGS. 1 and 2. Namely, as in FIG. 1, the rearward edge of lower rail (2a) having generally U-shaped cross-section is fit covered with a cap member (4) of similar shape, while a generally S shape of support leg member (3) is fit covered with another cap member (5) having a similar S-shaped configuration, thereby improving more aesthetically the rearward appearance of seat (1). Those two leg members (3)(3') are fixed on a floor of automobile by means of securing bolts.

However, those separate cap members (4, 4', 5, 5') have been found defective in that, firstly, because of the two-separate-piece nature, it is not easy to fit them over the associated elements or in other words it is impossible to fit them all thereon at one time. and secondly, the more forwardly is moved the seat (1), the more increasingly are exposed the rearward portions of both lower rails (2a, 2'a) from the mating cap members (4, 4'), which results in deteriorating the foregoing cap covering effect on the silde rails and support leg members. In addition, such exposed rearward portions of lower rails (2a, 2'a) are easy to be stepped on by a foot of occupant sitting on a rear seat behind the seat (1), in which case, his or her foot gets soiled with a lubricant oil layer on that exposed portions of lower rails, or injured cut by the edges in the the upper and lower rails (2a, 2b, 2'a, 2'b).

SUMMARY OF THE INVENTION

In view of the above-stated drawbacks, it is therefore a first purpose of the present invention to provide an improved cover for a slide rail of an automotive seat which is easy to be fitted over both slide rail and support leg member and improved in terms of aesthetic appearance and safety.

In order to achieve such purpose, a cover according to the present invention comprises a first cover section for covering a rearward end portion of the slide rail at a required length, and a second cover section for covering that one of said support leg members, wherein those first and second cover sections are formed integrally together.

Preferably, such required length, at which the first cover section covers the rearward end portion of slide rail, is determined by a distance between a rearward end of the lower rail and a foremost movable limit point at which the upper rail moves forwardly and stops when the seat is moved to the forward limit, whereby a rearward portion of the lower rail, which will be exposed externally with the forward movement of upper rail, is still covered with the first cover section.

It is a second purpose of the present invention to provide an improved cover in which said upper rail is allowed to pass without interference.

For this purpose, the cover has an opening formed therein, which permits the upper rail to pass therethrough, and a lid plate is mounted at such opening in a pivotally rotatable manner. The lid plate is biased by a spring means in a direction to close the opening. Accordingly, when the seat is moved to an extreme backward point, the upper rail contacts and presses against the lid plate, overcoming the biasing force of the spring means, so that the opening is opened to permit the movement of the upper rail therethrough along the lower rail.

In one aspect of the invention, the cover may be formed to either of outer and inner slide types of slide rails. The second cover section may be formed in a solid manner to conceal uneven or recessed spots of the support leg member.

DETAILED DESCRIPTION OF PREFERRED EMBODIMENTS OF THE INVENTION

At first, it should be understood that the present invention is directed to an improvement based on the previously stated prior-art seat (1) and seat slide rail arrangement (2, 2', 3, 3'), and all like designations in the prior art description correspond to all like designations given in this description.

Figure 1:
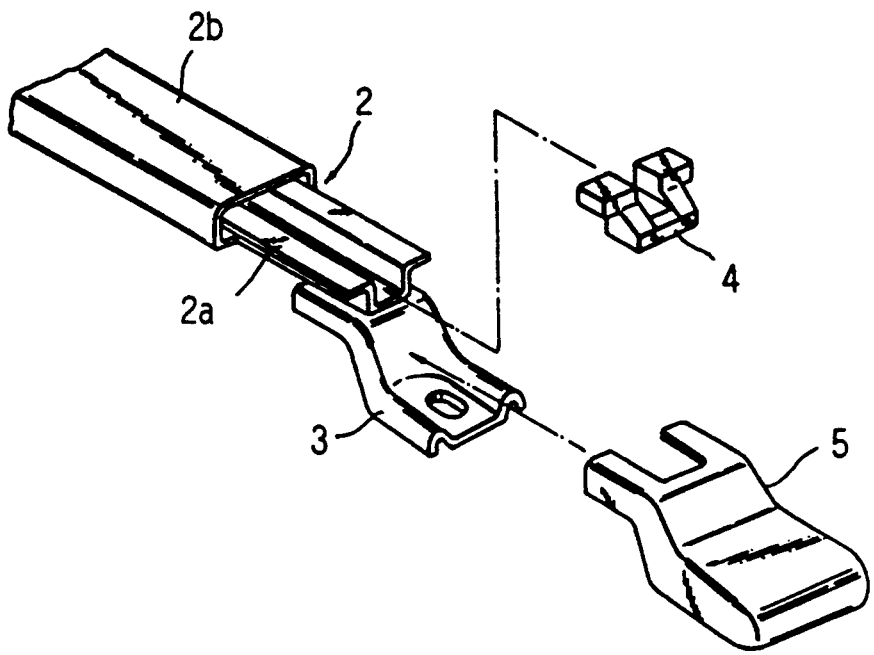
FIG. 1 is a partly exploded perspective view of one conventional cover for slide rail.
Figure 2:
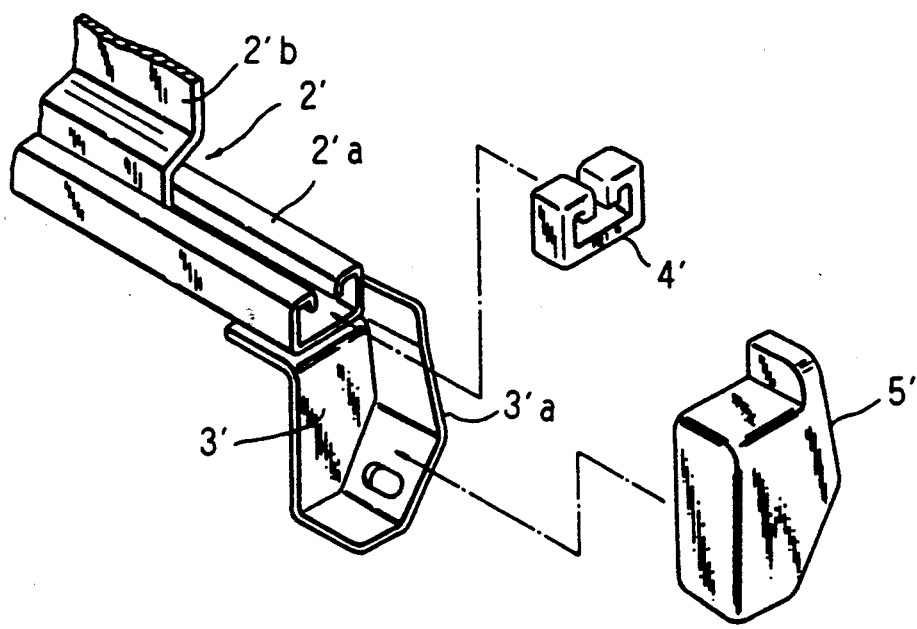
FIG. 2 is a partly exploded perspective view of another conventional cover for slide rail.
Figure 3:
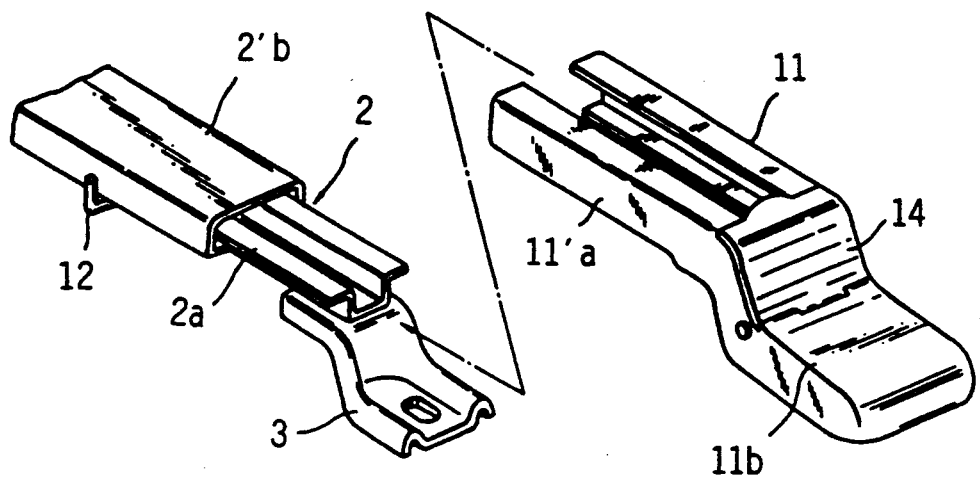
FIG. 3 is a partly exploded perspective view of a first, embodiment of cover for slide rail in accordance with the present invention.
Figure 4:
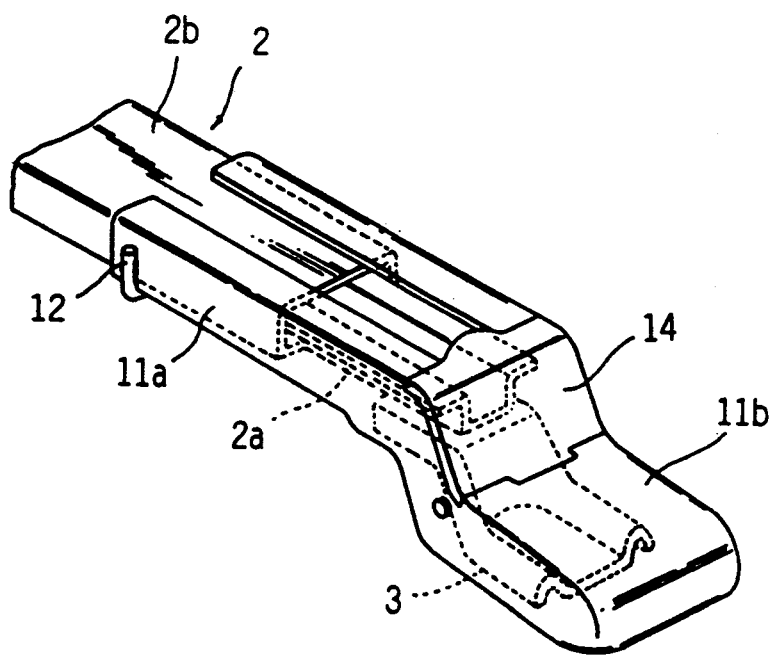
FIG. 4 is a perspective view of the same first embodiment of the invention, showing the cover to be fitted over the slide rail.
Figure 7:
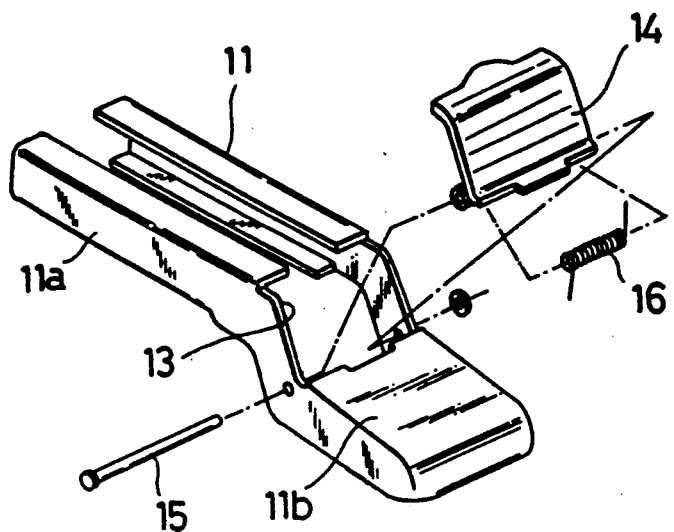
FIG. 7 is an exploded perspective view of the cover in FIG. 3.
Figure 9:
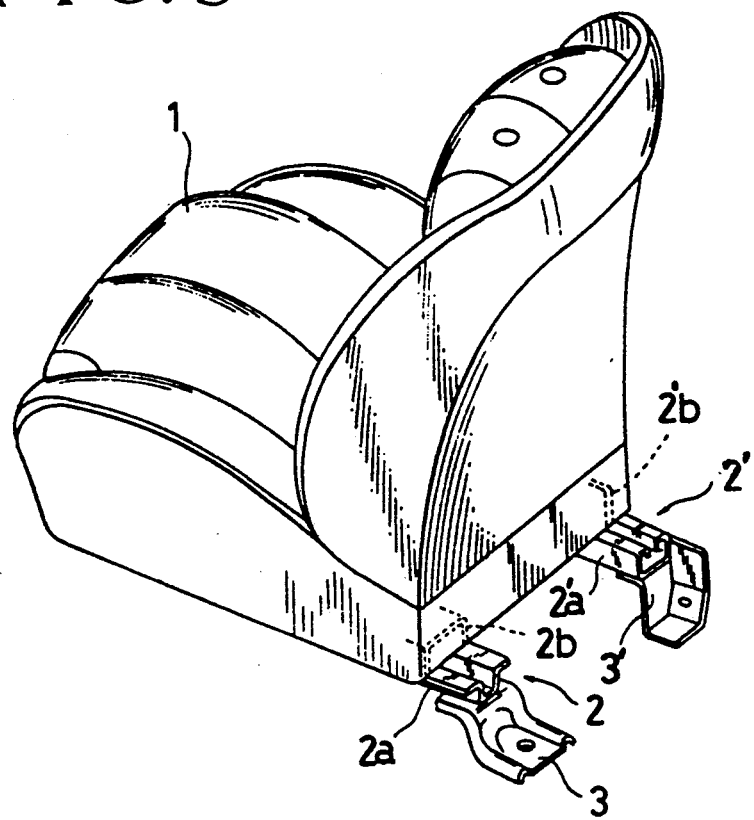
FIG. 9 is a perspective view of an automotive seat provided with a pair of slide rails.

Referring to FIGS. 3 and 4, there is shown a first embodiment of the present invention. In the present embodiment, designation (11) denotes a slide rail cover adapted to cover the left-side slide rail (2) and associated support leg member (3) which are shown in FIG. 9. The slide rail (2) is of a known outer slide type. The cover (11) is made of a soft or elastic synthetic resin material, and formed in a generally S-shaped configuration, comprising a rearward cover section (11b) of a generally L-shaped configuration conforming to the lower base part of support leg member (3), with a lid plate (14) being pivotally provided at the generally vertical part of the cover section (11b), and a forward cover section (11a) which is formed by a pair of spaced-apart cover portions, as best seen in FIG. 7, each having a channel cross-section, such that the opening sides of those cover portions being faced towards each other. The forward and rearward cover sections (11a)(11b) are formed integrally together, extending horizontally in a direction opposite to each other from the intermediate vertical part of rearward cover section (11b) where the lid plate (14) is mounted.

The illustrated configuration of forward cover section (11a) should be of a size that may accommodate therein the rearward portion of upper rail (2b), allowing a sliding motion of that upper rail rearward portion therethrough, as understandable from FIG. 4. Namely, the pair of spaced-apart cover portions of forward cover section (11a) serve to embracingly cover both lateral sides of upper rail (2b) in such a manner as to permit the upper rail (2b) to move slidingly within those two cover portions of forward cover section (11a) along the lower rail (2a) in the longitudinal direction. The length of thus-formed forward cover section (11a) should preferably be such as to cover a movable range in which the upper rail (2b) moves forwardly and backwardly on the lower rail (2a) together with the seat (1). In this respect, referring to FIGS. 8(A) and 8(B), the seat may be adjustably moved a predetermined distance in the fore-and-aft direction as shown and therefore it is desirable that the forward cover section (11a) should have a length covering such distance, in order to also cover the portion of lower rail (2a) which will be exposed externally into view as the upper rail (2b) moves forwardly, as in FIG. 8(A), relative to the lower rail (2a). This conceals the lower rail (2a), thus adding to the aesthetic improvement on the rear side of seat (1).

Designation (12) denotes a stopper member fixed at the lower rail (2a), which is adapted to support the free end part of the foregoing forward section (11a). The stopper member (12), thought not shown clearly, is a generally U-shaped wire which extends transversely of both upper and lower rails (2b)(2a), and functions to retain the forward cover section (11a) against movement or deformation, thereby avoiding interference of that cover section with the movement of upper rail (2b).

Figure 8:
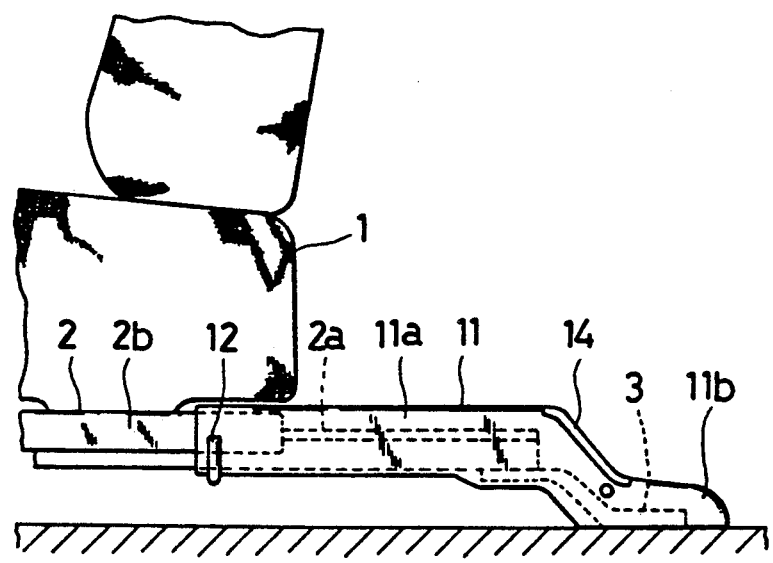
FIG. 8(A) is a schematic diagram which explanatorily shows the actions of slide rail and lid plate.
FIG. 8(B) is a schematic diagram showing the lid plate to be opened.
Figure 8:
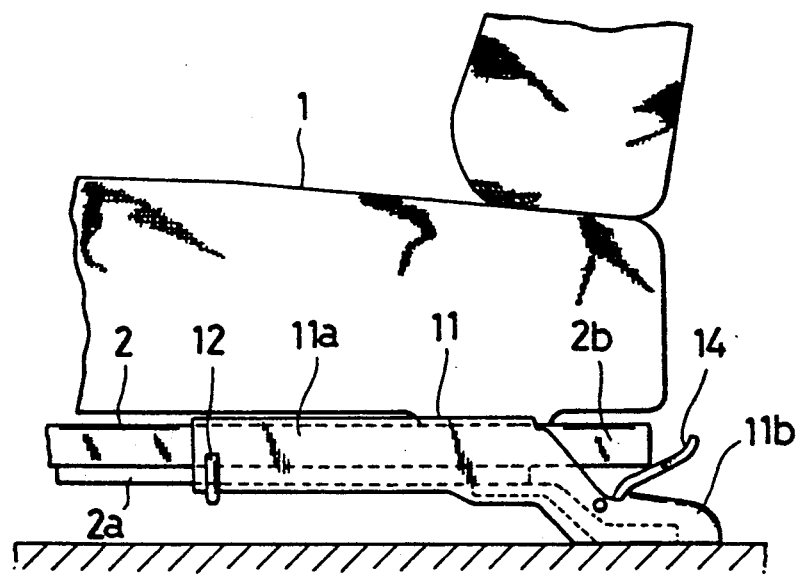

The rearward cover section (11b) is formed to cover the generally L-shaped base portion of support leg member (3) from above, as can be seen from FIG. 4. The lid plate (14), as best shown in FIG. 7, is mounted such as to cover the opening (13) defined in the intermediate vertical part of rearward cover section (11a). The lower base end of lid plate (14) is connected pivotally to the lower edge of that opening (13) by means of a pin (15). The lid plate (14) is biased in a direction to close the opening (13) by means of a coil spring (16) wound about the the pin (15), so that normally the opening (13) is kept closed by such lid plate (14) to provide a continuity between the rear and forward cover sections (11a)(11a) on the whole, contributing to a uniform covering effect at the rear end side of slide rail (2). The lid plate (14) further severs to allow the rearward end of upper rail (2a) to pass through the opening (13), as shown in FIG. 8(B), when the seat (1) is moved to the extremely backward direction. In this case, the upper rail rearward end contacts and presses against the lid plate (14) to cause the same to rotate about the pin (15) backwardly, overcoming the baising force of spring (16).

Figure 5:
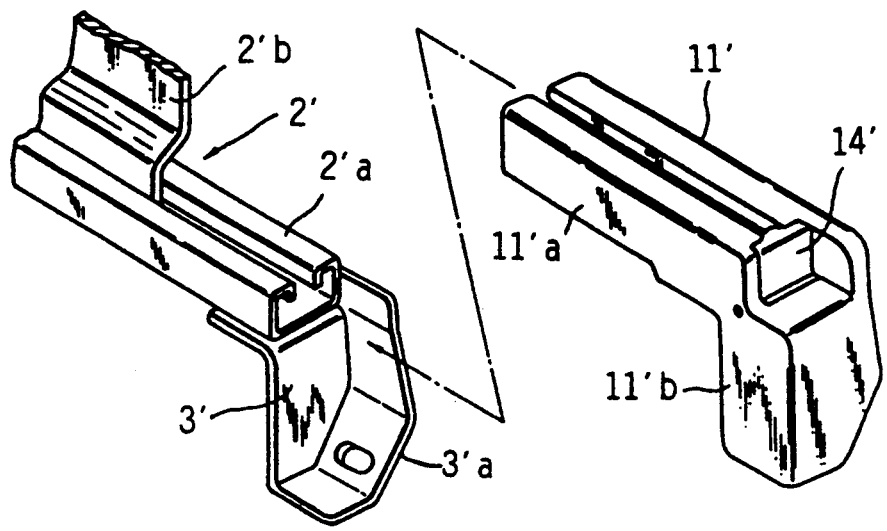
FIG. 5 is a partly exploded perspective view of a second embodiment of cover in the invention.
Figure 6:
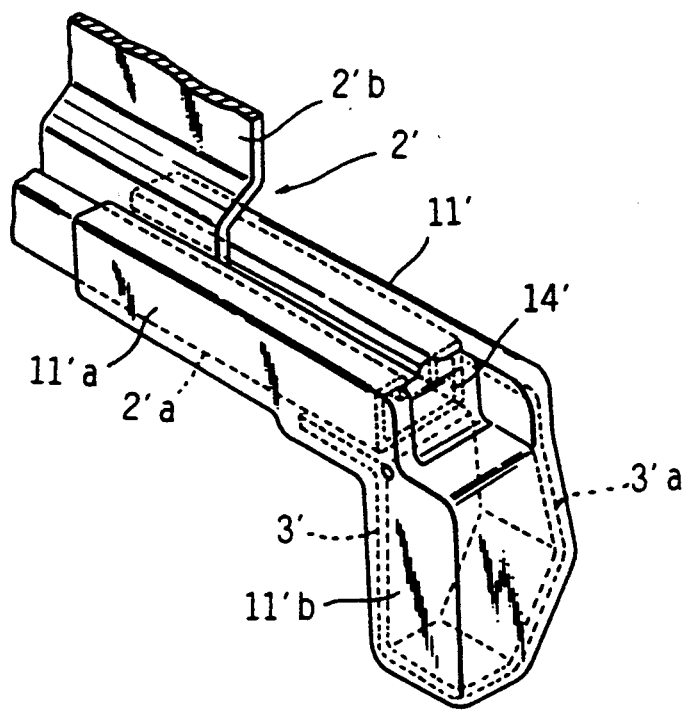
FIG. 6 is a partly broken perspective view of the second embodiment, showing the cover to be fitted over the slide rail.

Referring to FIGS. 5 and 6, there is shown a second embodiment of the present invention, according to which, there is provided another slide rail cover (11') adapted to cover the rear end portion of the right-side slide rail (2') as well as the associated support leg member (3') (as viewed from FIG. 9). The slide rail (2') is of a known inner slide type.

The cover (11') is also made of a soft or elastic synthetic resin material. It comprises a horizontal forward cover section (11'a) and a vertical reward cover section (11'b) dependent therefrom, both of which sections (11'a)(11'b) are formed integrally together.

The forward cover section (11'a) is formed in a configuration covering the generally U-shaped lower rail (2'a); namely, the same is formed with a pair of spaced-apart cover portions which embracingly cover the respective both lateral sides of lower rail (2'a), providing an elongated opening therebetween (which is also found in the first embodiment above), to permit the upstanding upper rail (2'b) to move forwardly and bckwardly along the lower rail (2'a). As similar to the forward cover section (11a) of the first embodiment, the length of this particular cover section (11'a) should preferably be such as to cover the distance within which the upper rail (2'b) moves along with the seat (1), to thereby cover the portion of lower rail (2'a) which will be exposed into view as the upper rail (2'b) moves forwardly (see FIGS. 8(A) for understanding).

The rearward cover section (11'b) is disposed in a manner dependent from the rearward end of the foregoing forward cover section (11'a), having, provided at its upper part, a lid plate (14'). The illustrated configuration of this particular cover section (11'b) is so made as to cover the spacing defined between the flat part and projected flange part (3'a) of support leg member (3'); in other words, formed generally in a shape having a symmetric relation with that of the support leg member (3'). Thus, the rearward cover section (11'b) has a wall protrudent as against the recessed spacing at the support leg member (3'), thereby covering the latter in a cubic or solid manner and thus giving a stable sense visually at the rear side of seat (1), as in FIG. 6.

The lid plate (14') is constructed in the same way as described in the one (14) of first embodiment, for normally closing an opening (not clearly shown but similar to the opening (13) in the first embodiment) through which the rear end portion of the upper rail (2'b) passes. In brief, the lid plate (14') is also rotatably connected to the lower edge of the opening by means of a pin and biased in a direction to close the opening by a coil spring wound about the pin. With this rotatable lid plate (14'), the upper rail (2'b) is allowed to move to the extreme backward end relative to the lower rail (2'a), likewise in the first embodiment as can be seen from FIGS. 8(A) and 8(B).

From the above descriptions, it is to be appreciated that, in contrast to the previously stated prior art, according to the present invention, the cover (11, 11') can be easily fitted over both support leg member (3, 3') and rearward portion of slide rail (2, 2') at one time, and covers the whole of them, irrespective of fore-and-aft movement of the upper rail (2b, 2'b), hence improving better the aesthetic appearance at the rear side of seat (1). Further, the lower rail (2a, 2'a) is substantially covered with the forward cover section (11a, 11'a) over the range within which the seat (1) or upper rail (2a, 2'a) moves in the foreward and backward directions, which effectively eliminates the possibility that a foot or bare foot of an occupant on a rear seat behind the seat (1) will get soiled with a lubricant oil on the slide rail or be cut injured by the edges of lower rail which is exposed external y as the seat (1) moves forwardly. The present invention is therefore significant both in terms of improvement on the seat appearance and safe consideration in this sort of seat provided with slide rails.

While having described the present invention thus far, it is to be noted that the invention is not limited to the illustrated embodiments, but any other modification, replacement and addition may structurally be possible thereto without departing from the spirit and scope of the appended claims.

What is claimed is:

1. A cover for a slide rail of an automotive seat, wherein said side rail includes an upper rail upon which the seat is fixedly mounted, and a lower rail having support leg members fixed on a floor of an automobile, said upper rail being slidably fitted with said lower rail so that said upper rail is movable a predetermined distance along a longitudinal direction of said lower rail, thereby permitting said seat to be adjustably movable in forward and backward directions, said cover comprising:

a first cover section for covering both rearward end portions of said upper and lower rails of said slide rail at a length corresponding to said predetermined distance;

a second cover section for covering one of said support leg members;

said first and second cover sections being formed integrally together;

an opening means for allowing said upper rail to pass therethrough; and a lid means which is pivotally provided at said opening means in a rotatable manner, said lid means being biased by a spring means in a direction to close said opening means.

2. The cover as claimed in claim 1, wherein said seat slide rail is of an outer slide type in which said upper rail is generally formed in U shape, which is engaged over said lower rail in an embracing way, wherein one of said support leg members is disposed at a rear side of said seat and supports a rearward end part of said lower rail, wherein said first cover section is so formed as to cover both of said upper and lower rails at said required length, and wherein said second cover section is integrally formed at an rearward end of said first cover section, so as to cover said one of said support leg members which supports said rearward end part of said lower rail, both of said first and second cover sections being made of a synthetic resin material.

3. The cover as claimed in claim 1, wherein there is provided a stopper member at said lower rail, which is adapted to retain said first cover section against movement or deformation.

4. The cover as claimed in claim 1, wherein said slide rail is of an inner slide type in which said upper rail is slidably fitted in said lower rail, wherein one of said support leg members is disposed at a rear side of said seat and supports a rearward end part of said lower rail, wherein said first cover section is so formed as to cover a rearward end portion of said lower rail at said required length, and wherein said second cover section is integrally formed at a rearward end of said first cover section so as to cover said one of said support leg members.

5. The cover as claimed in claim 1 wherein said first and second cover sections are made of a synthetic resin material.

6. A cover for a slide rail of an automotive seat, wherein said side rail includes an upper rail upon which the seat is fixedly mounted, and a lower rail having support leg members fixed on a floor of an automobile, said upper rail being slidably fitted with said lower rail so that said upper rail is movable a predetermined distance along a longitudinal direction of said lower rail, thereby permitting said seat to be adjustably movable in forward and backward directions, and wherein said predetermined distance is a distance between a rearward end of said lower rail and a foremost movable limit point of said upper rail at which said upper rail moves forwardly and stops relative to said lower rail when said seat is moved to the forward limit, said cover comprising:

a first cover section for covering both rearward end portions of said upper and lower rails of said slide rail at a length corresponding to said distance, thereby keeping to cover the rearward end portion of said lower rail which is to be exposed externally with said forward movement of said upper rail;

a second cover section for covering one of said support leg members;

said first and second cover sections being formed integrally together;

an opening means for allowing said upper rail to pass therethrough; and a lid means which is pivotally provided at said opening means in a rotatable manner, said lid means being biased by a spring means in a direction to close said opening means.

7. The cover as claimed in claim 6 wherein said first and second cover section are made of a synthetic resin material.

* * * * *